April 2, 1940. C. G. OLSON 2,195,598
FASTENING DEVICE
Filed July 21, 1937
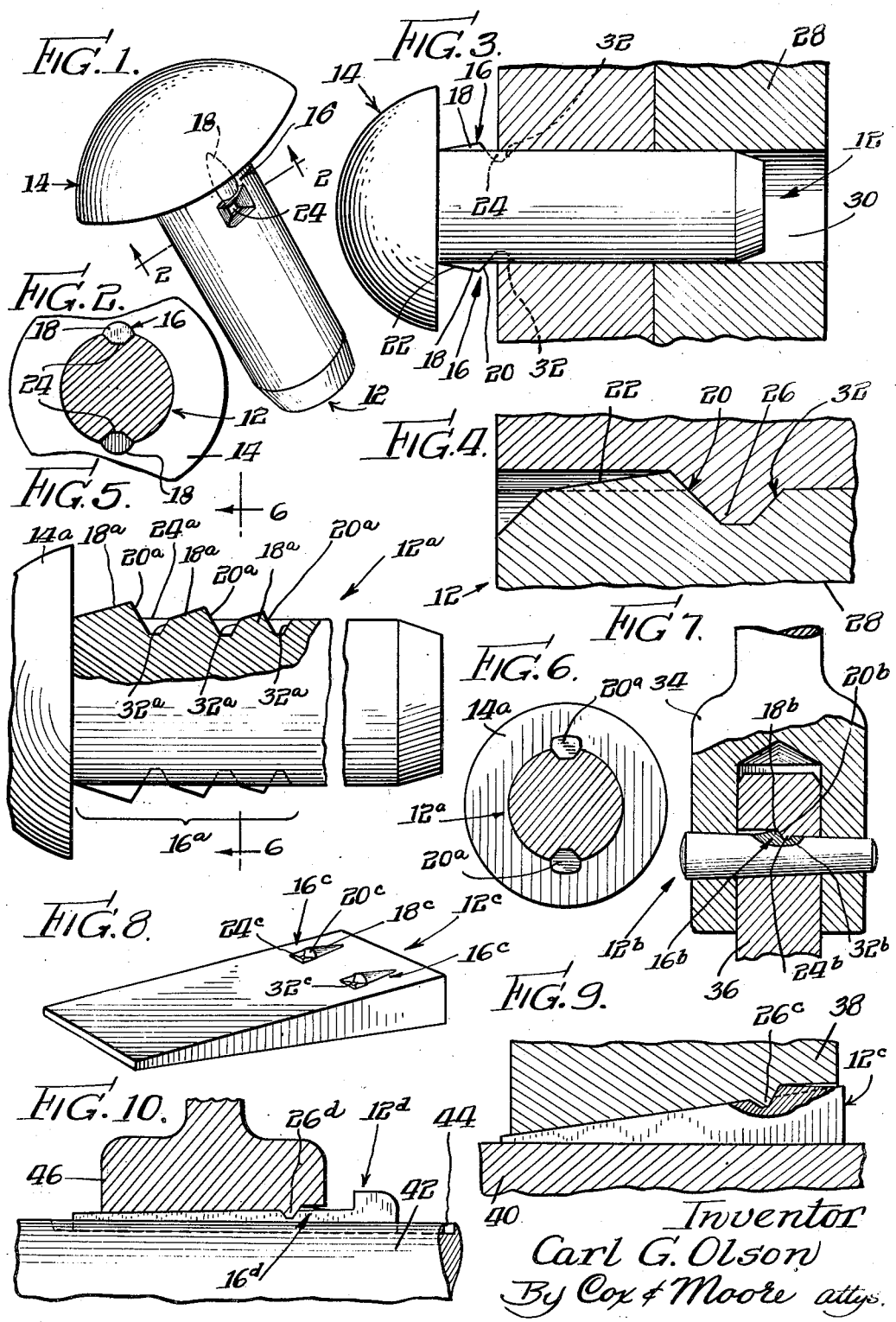
Inventor
Carl G. Olson
By Cox & Moore attys.

Patented Apr. 2, 1940

2,195,598

UNITED STATES PATENT OFFICE 2,195,598

FASTENING DEVICE

Carl G. Olson, Chicago, Ill., assignor to Illinois Tool Works, Chicago, Ill., a corporation of Illinois Application July 21, 1937, Serial No. 154,821

7 Claims. (Cl. 85—5)

This invention relates generally to fasteners for use in metal and the like, and more particularly to fasteners of the hammer-driven type whereby a novel and improved method of securing a pin or similar hammer-driven member against axial displacement may be practiced.

The invention contemplates the provision of a fastener or pin which, when longitudinally driven into an aperture in metal of a diameter substantially equal to the diameter of the pin, will cause a section of the metal in the work to be shifted in the direction of movement of the pin and into a depression provided in the surface of the fastener or pin whereby to effectively secure said pin against unauthorized withdrawal.

It is an object of the invention to provide a hammer-driven fastener or pin, as referred to above, which will set up a minimum amount of resistance to the force driving it into the work, and at the same time will cause a sufficient amount of the work to be shifted or crowded into the confines of the pin to effect a perfect fastening.

Another object of the invention is to so arrange the peripheral or external surface of the hammer-driven fastener as to enable said fastener to be inserted a considerable distance within the aperture before the shifting or crowding of a section of the work into the confines of the fastener body takes place, whereby to enable the locking of the pin within the work to be accomplished during the final stages of the driving force exerted against the pin.

More specifically, the invention contemplates a hammer-driven fastener, as set forth above, in which the external surface, or the peripheral surface in the case of round pins, is provided with locking elements adapted to cause the flowing of material in the work piece without actually severing the stock, whereby to provide an unsevered rigid mass which positively prevents inadvertent withdrawal of the fastener.

The foregoing and numerous other objects and advantages will be more apparent from the following detailed description when considered in connection with the accompanying drawing, wherein—

Figure 1 is a perspective view of a hammer-driven fastener provided with a locking section which is representative of one embodiment of the invention;

Figure 2 is an enlarged transverse sectional view of the fastener shown in Figure 1 to more clearly illustrate the arrangement of the work shifting element and depression for receiving the section of the work shifted by said element;

Figure 3 discloses the fastener of Figures 1 and 2 initially inserted within the aperture of a work piece;

Figure 4 is an enlarged fragmentary sectional view of the locking section and work of the fastener shown in Figure 3 to illustrate how the locking section on the fastener functions in shifting or crowding material of the work in the direction of movement of the fastener into a peripheral depression;

Figure 5 is a side elevational view shown partly in section, of a modified fastener equipped with a plurality of locking sections of varying heights, as distinguished from the single locking section shown in Figures 1 to 4, inclusive;

Figure 6 is a transverse sectional view taken substantially along the line 6—6 of Figure 5;

Figure 7 illustrates the manner in which the present invention may be incorporated within a tapered pin, which provides a pivotal connection between two work pieces;

Figure 8 is a perspective view of a tapered wedge member incorporating features of the present invention;

Figure 9 illustrates how the wedge member of Figure 8 functions to cause the shifting of the work in the direction of movement of the wedge to positively secure said wedge against loosening; and Figure 10 illustrates the manner in which the present invention may be applied to a tapered key for positively securing said key against longitudinal displacement within its complementary keyway.

Referring now to the drawing more in detail wherein like numerals have been employed to designate similar parts throughout the various views, it will be seen that for the purpose of illustrating one practical embodiment of the invention, I have shown in Figures 1 to 4, inclusive, a hammer-driven fastener designated generally by the numeral 12. The body of the fastener or pin 12 is cylindrical in cross-section and is provided with oppositely disposed locking sections indicated generally by the numeral 16. These locking sections 16 include a work shifting element 18 extending outwardly from the cylindrical body of the fastener. Each of these work shifting elements 18 has a work engaging or shifting surface 20, which is preferably inclined with respect to the fastener axis in one direction and a trailing external surface 22 which is oppositely inclined at a lesser angle to the fastener axis. The inclined work shifting surfaces 20 extend into a recess or depression 24 within the cylindrical body of the fastener. These depressions are provided to receive a section 26 of a work piece 28 (Figure 4), which is crowded into the depression in response to a force exerted axially in the direction indicated by the arrows in Figures 3 and 4.

The fastener 12, as shown in Figure 3, has been initially inserted within an aperture 30 of a diameter which is substantially equal to or slightly larger than the diameter of the fastener body. By imparting a hammer-blow to the head of the fastener 12, each element 18 of the locking sections 16 causes a section of the work to flow or shift in the form of an unsevered mass into the complementary depression 24. Thus the locking sections 18 cause material of the work to be shifted in the direction of movement of the fastener and at the same time cause this advanced unsevered section of the work to be crowded inwardly into the peripheral confines of the fastener.

As previously pointed out, one side of each depression 24 is bounded by the inclined surface 20, and it will be noted that the opposite side of the depression is bounded by an inclined abutment section or surface 32. This abutment surface 32 cooperating with the adjacent surface of the rigid unsevered mass 26 opposes shifting of the fastener to the left (Figure 4). In the fastener just described I have disclosed two oppositely disposed locking sections, but obviously the number of locking sections may be determined by the nature of the work to be fastened, the size of the fastener, etc.

In Figures 5 and 6 I have shown a fastener of modified form which is constructed in accordance with the locking principle just described in connection with the fastener of Figures 1 to 4, inclusive. The fastener of Figures 5 and 6 is denoted generally by the numeral 12a and constitutes a cylindrical body portion with a head 14a provided at one extremity thereof. Diametrically opposed peripheral portions of the fastener body at the head end thereof are provided with a plurality of locking sections (three in number), each group of said sections being designated generally by the numeral 16a. Each locking section of the groups 16a includes a work shifting element 18a having an inclined work shifting surface 20a, a depression 24a, and an inclined abutment surface or section 32a. These locking sections function similarly to the locking sections 16 previously described in causing material of the work into which the fastener is driven, to be shifted or flowed in the direction of movement of the fastener and inwardly so as to crowd into the depressions or recesses 24a. Particular attention is directed to the fact that the locking sections of each group 16a diminish in height from the head 14a toward the entering end of the fastener. In other words, the work shifting element 18a positioned nearest the head projects outwardly from the periphery of the cylindrical fastener body a greater distance than the next adjacent element, and this latter element projects outwardly a greater distance than the element next adjacent thereto. In this manner all of the locking sections operatively function to cause material of the work to flow into each of the depressions 24a and to render the abutment sections or surfaces 32a operative in preventing unauthorized withdrawal of the fastener in the same way as the abutment surfaces 32 cooperate with the rigid unsevered mass 26 previously described.

Figure 7 discloses the application of the present invention to a tapered drive pin or fastener 12b. This pin 12b is of the type frequently employed to pivotally connect a pair of members, such as the members 34 and 36 of Figure 7. An aperture is first provided within these parts to accommodate the tapered pin, and this pin is provided with a locking section 16b. This locking section 16b includes a work shifting element 18b having a work shifting surface 20b, a depression 24b, and an abutment section or surface 32b. As the tapered pin or fastener 12b is finally driven into the alined apertures of the work pieces 34 and 36, material of the work 36 is caused to shift in the direction of movement of the pin and to be crowded into the depression 24b so as to secure the pin against inadvertent axial displacement.

Figures 8 and 9 disclose the application of the invention to a wedge type fastener or member 12c. One of the outer surfaces of the wedge member 12c is provided with one or more locking sections 16c, and each of these sections includes a work shifting element 18c, a work shifting surface 20c, and an abutment section or surface 32c. In Figure 9 I have disclosed the manner in which locking sections 18c function to cause material of the work to be shifted in the direction of movement of the wedge member and into the depression 24c after the wedge member has been inserted a considerable distance into an aperture provided between work pieces 38 and 40. The shifting of the locking section causes a rigid unsevered section 26c of the work to be crowded into the depression 24c and thus secure the wedge member against unauthorized displacement.

Figure 10 discloses still another practical application of the present invention. In this embodiment a key type fastener 12d is provided in a locking section 16d which is similar to the locking section 16c. One of the work pieces comprises a shaft 42 having a keyway 44 for receiving the key 12d. The other work piece 46 is adapted to be secured as a unit to the shaft 42 after the key 12d has been inserted and driven longitudinally so as to cause a rigid unsevered section 26d of the work piece 46 to be shifted in the direction of movement of the driven key and crowded into the depression of the locking section 16d. In this manner the key 12d is secured against unauthorized movement in a direction axially with respect to the work member 46.

From the foregoing it will be apparent that the present invention has many practical applications in the field where a fixed connection must be established by a hammer-driven member or fastener. The locking sections previously described are so arranged as to require a relatively light hammer action to effect the shifting of the work in the direction of the fastener and into the confines of the body thereof. Furthermore, this shifting of stock does not take place until the fastener pin, wedge member, or the like has been almost completely inserted within the aperture of the work. In other words, the hammer force required to cause the flowing or shifting of the work material into the confines of the fastener body need only be applied during the final stages of the insertion of the fastener. This must be clearly distinguished from fasteners which are so designed as to require the embedding of locking elements or ribs to take place immediately upon the initial insertion of the fastener within the aperture of the work. Such fasteners require a considerable hammer-driven force to insure complete insertion, and in some instances the resistance to the hammer blows is so great as to prevent the head of the fastener from being tightened against the surface of the work.

It will also be apparent from the foregoing description that the invention contemplates the practice of a method of fastening the periphery of longitudinally movable fastener members to a work piece, which comprises the forming of a depression and a juxtapositioned projection on the surface of one of the members, and then relatively moving said members in a direction longitudinally of the fastener member so as to push metal in an unsevered rigid mass from the work piece in the direction of longitudinal movement of the fastener member, and crowding said rigid unsevered mass into the confines of the body of the fastener member. This method contemplates the shifting of a section of the work in the direction of longitudinal movement of the fastener without imparting relative rotary movement to the fastener and work. The invention contemplates a method of locking together the external surface of a longitudinally shiftable fastener member and the complementary internal surface of an apertured work member, which comprises the formation of a depression and a juxtapositioned projection on the surface of one of the members, relatively and longitudinally shifting said members by the application of a force in a longitudinal direction with the projection trailing the depression, whereby to cause the projection on one surface to shift material of the other complementary surface in a longitudinal direction in advance of the projection, and to crowd said material in said depression to thereby interlock the members.

The locking sections described and disclosed herein may be formed in any suitable manner upon the periphery or external surface of the fastener member, for example, by means of a punch or die. In instances where the locking sections are provided on pinlike bodies, they may be produced therein by rolling said members or blanks between die members having a working surface provided with counterparts of said locking sections. Thus fasteners embodying the invention herein described may be manufactured by the practice of economical machine shop methods.

While for purposes of illustration certain practical embodiments of the invention have been disclosed and described herein, it should be understood that the locking sections may be modified or changed in structural detail without departing from the spirit and scope of the appended claims, and furthermore the invention is not limited in its application to the disclosure herein.

Having thus described my invention, what I claim as new and desire to secure by Letters Patent is:

1. A hammer-driven fastener of relatively hard material adapted to be longitudinally driven into a complementary aperture in a work piece of relatively soft material, including a body portion for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element capable of axially shifting the relatively soft work material, an abutment section positioned in advance of said element, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

2. A hammer-driven fastener of relatively hard material adapted to be longitudinally driven into a complementary aperture in a work piece of relatively soft material, including a body portion for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element extending beyond the external surface of said body capable of axially shifting the relatively soft work material, an abutment section positioned in advance of said element, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

3. A hammer-driven fastener of relatively hard material adapted to be longitudinally driven into a complementary aperture in a work piece of relatively soft material, including a body portion for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element capable of axially shifting the relatively soft work material, an abutment section positioned in advance of said element and extending within said body, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

4. A hammer-driven fastener of relatively hard material adapted to be longitudinally driven into a complementary aperture in a work piece of relatively soft material, including a body portion for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element capable of axially shifting the relatively soft work material, an abutment section positioned in advance of said element, and a work receiving section extending into said body and interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

5. A hammer-driven fastener of relatively hard material adapted to be longitudinally driven into a complementary aperture in a work piece of relatively soft material, including a body portion of circular cross-section for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element capable of axially shifting the relatively soft work material, an abutment section positioned in advance of said element, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

6. A hammer-driven fastener of relatively hard material adapted to be longitudinally driven into a complementary aperture in a work piece of relatively soft material, including a tapered body portion for longitudinal insertion into said complementary aperture, and an enlarged head integral with one end of the body portion, said body portion having work engaging parts arranged in progressively tapering relationship in a direction away from said enlarged head and comprising a locking section on the external surface of said body including a work shifting element capable of axially shifting the relatively soft work material, an abutment section positioned in advance of said element, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

7. A hammer-driven fastener of relatively hard material adapted to be longitudinally driven into a complementary aperture in a work piece of relatively soft material, including a body portion for longitudinal insertion into said complementary aperture, and a plurality of locking sections of varying size distributed longitudinally upon the external surface of said body, each of said locking sections including a work shifting element capable of axially shifting the relatively soft work material, an abutment section positioned in advance of said element, and a work receiving section interposed between said element and abutment section whereby, when said body is longitudinally driven into the aperture of the work, said work shifting element will cause a section of the work piece in the vicinity of said aperture to be shifted into locking association with said abutment section within said work receiving section to thereby secure said body against longitudinal movement within the work.

CARL G. OLSON.